United States Patent
Abe et al.

(10) Patent No.: US 9,588,472 B2
(45) Date of Patent: Mar. 7, 2017

(54) IMAGE FORMATION APPARATUS AND IMAGE FORMATION METHOD

(71) Applicants: Yasuhiro Abe, Kanagawa (JP); Satoshi Ohmiya, Kanagawa (JP); Masahiko Oikawa, Kanagawa (JP); Makoto Higashiyama, Kanagawa (JP); Yuichiro Shukuya, Kanagawa (JP); Tatsuya Miyadera, Kanagawa (JP)

(72) Inventors: Yasuhiro Abe, Kanagawa (JP); Satoshi Ohmiya, Kanagawa (JP); Masahiko Oikawa, Kanagawa (JP); Makoto Higashiyama, Kanagawa (JP); Yuichiro Shukuya, Kanagawa (JP); Tatsuya Miyadera, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 26 days.

(21) Appl. No.: 14/797,927

(22) Filed: Jul. 13, 2015

(65) Prior Publication Data
US 2016/0018774 A1    Jan. 21, 2016

(30) Foreign Application Priority Data
Jul. 15, 2014  (JP) ................ 2014-145048

(51) Int. Cl.
*G03G 15/00* (2006.01)
*H04N 1/40* (2006.01)
(Continued)

(52) U.S. Cl.
CPC ....... *G03G 15/5058* (2013.01); *G09G 3/2051* (2013.01); *H04N 1/405* (2013.01); *H04N 1/4051* (2013.01); *H04N 1/40087* (2013.01)

(58) Field of Classification Search
None
See application file for complete search history.

(56) References Cited

U.S. PATENT DOCUMENTS 6,906,825 B1 *  6/2005  Nakahara ............. H04N 1/4051
                                              358/1.9
7,251,060 B2 *  7/2007  Tonami ................ H04N 1/4057
                                              358/3.16
(Continued)

FOREIGN PATENT DOCUMENTS

JP    2012-195715    10/2012

OTHER PUBLICATIONS

English machine translation of JP2012195715A; by Hirota,So;Mamiya,Yusuke;Mitsuzaki,Masahiro;Nakano, Munenori; "Image Forming Apparatus and Method of Correcting Grayscale Reproduction Characteristics"; published Oct. 11 ,2012.*

*Primary Examiner* — David Gray
*Assistant Examiner* — Geoffrey T Evans
(74) *Attorney, Agent, or Firm* — Duft Bornsen & Fettig LLP

(57) ABSTRACT

An image formation apparatus for forming an image and test patterns. The image formation apparatus includes a storage unit that stores dither matrix data used to form the image and the test patterns; and an image formation unit that forms the test patterns based on the dither matrix data. A number of tones of the test patterns to be formed by the image formation unit is changed and the number of tones is determined based on a size of the dither matrix data and a number of bits per pixel within the dither matrix data.

6 Claims, 9 Drawing Sheets

(51) Int. Cl.
*H04N 1/405* (2006.01)
*G09G 3/20* (2006.01)

(56) References Cited

U.S. PATENT DOCUMENTS

| | | |
|---|---|---|
| 7,835,412 B2 | 11/2010 | Abe |
| 8,508,800 B2 | 8/2013 | Abe |
| 2006/0055981 A1* | 3/2006 | Aihara ................. H04N 1/4078 358/3.13 |
| 2007/0070423 A1* | 3/2007 | Kakutani ............. H04N 1/4057 358/3.01 |
| 2010/0103467 A1* | 4/2010 | Abe ..................... H04N 1/4055 358/3.13 |
| 2012/0062681 A1* | 3/2012 | Miyadera ............. G03G 15/043 347/116 |
| 2012/0224191 A1 | 9/2012 | Abe |
| 2012/0300010 A1* | 11/2012 | Kawanabe ........... G03G 15/043 347/232 |
| 2013/0022364 A1 | 1/2013 | Abe |
| 2015/0092240 A1* | 4/2015 | Miyake ................ H04N 1/4051 358/2.1 |

* cited by examiner

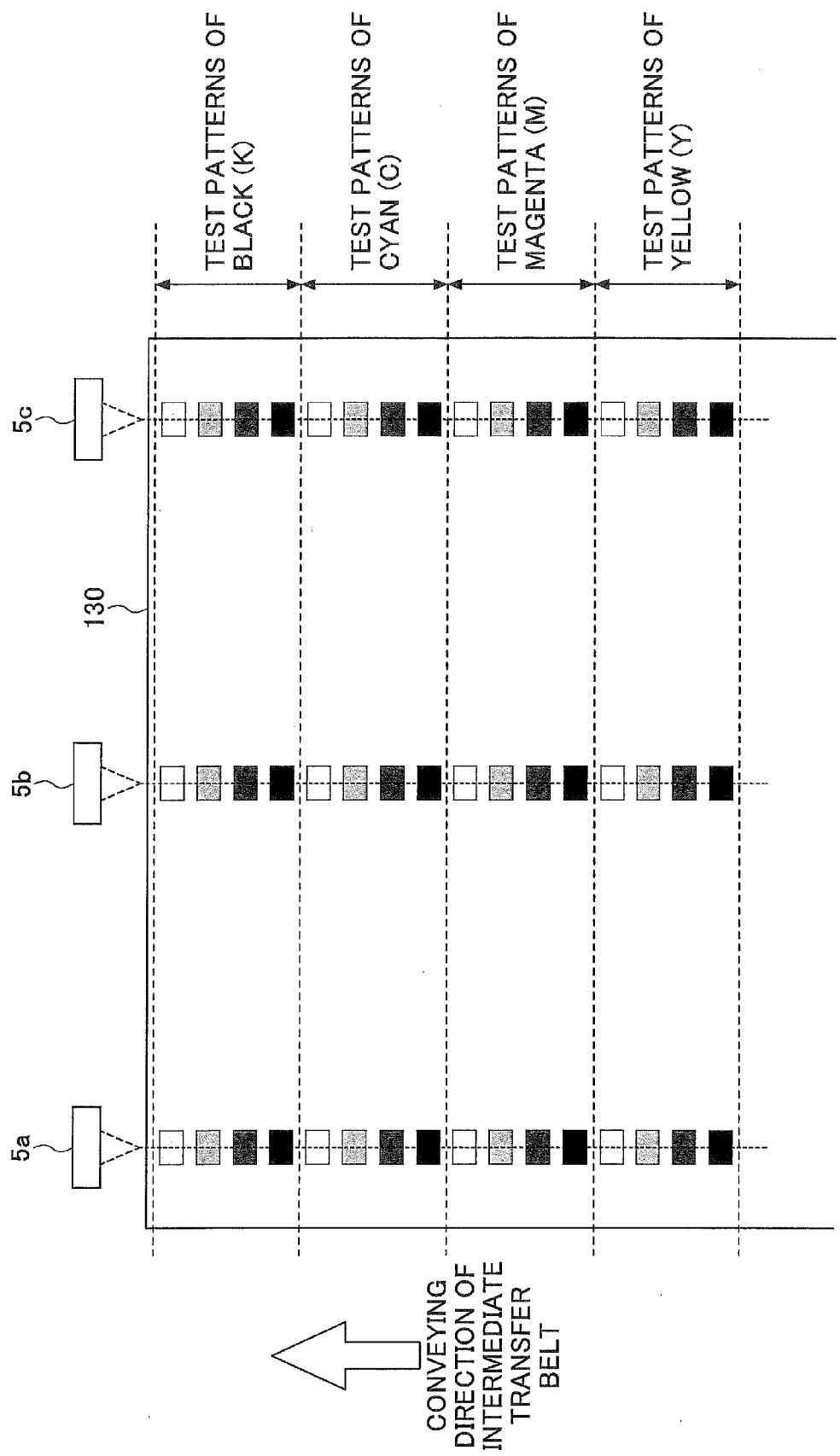

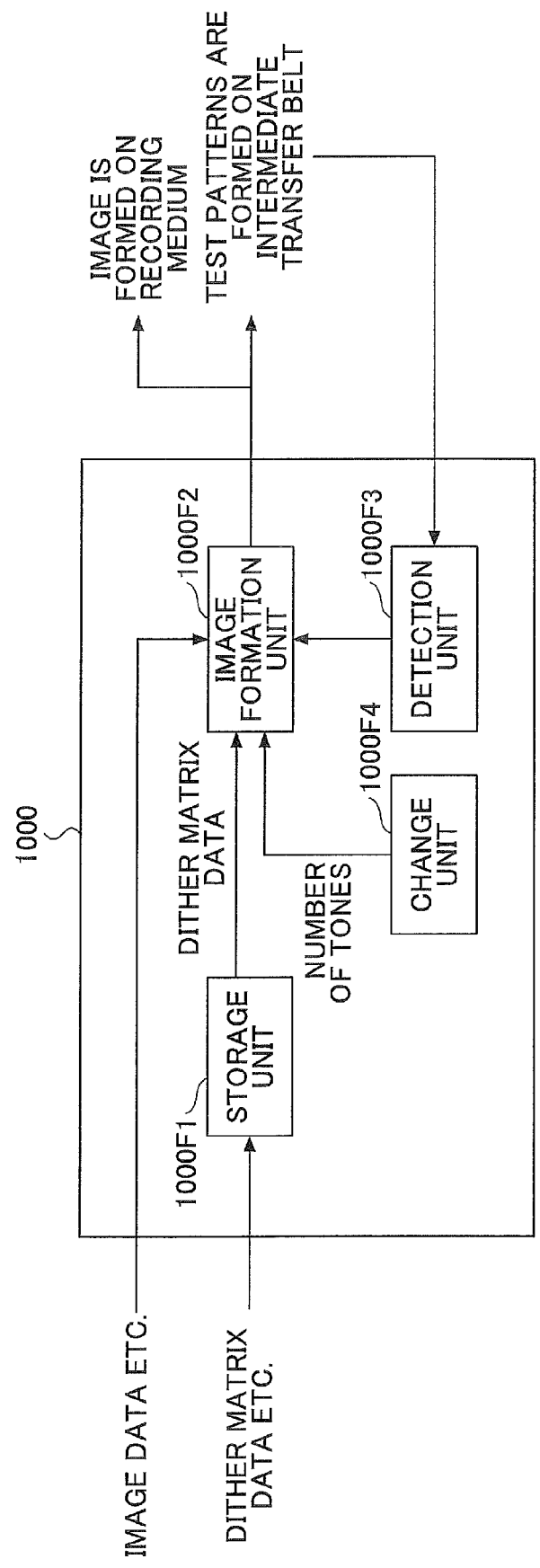

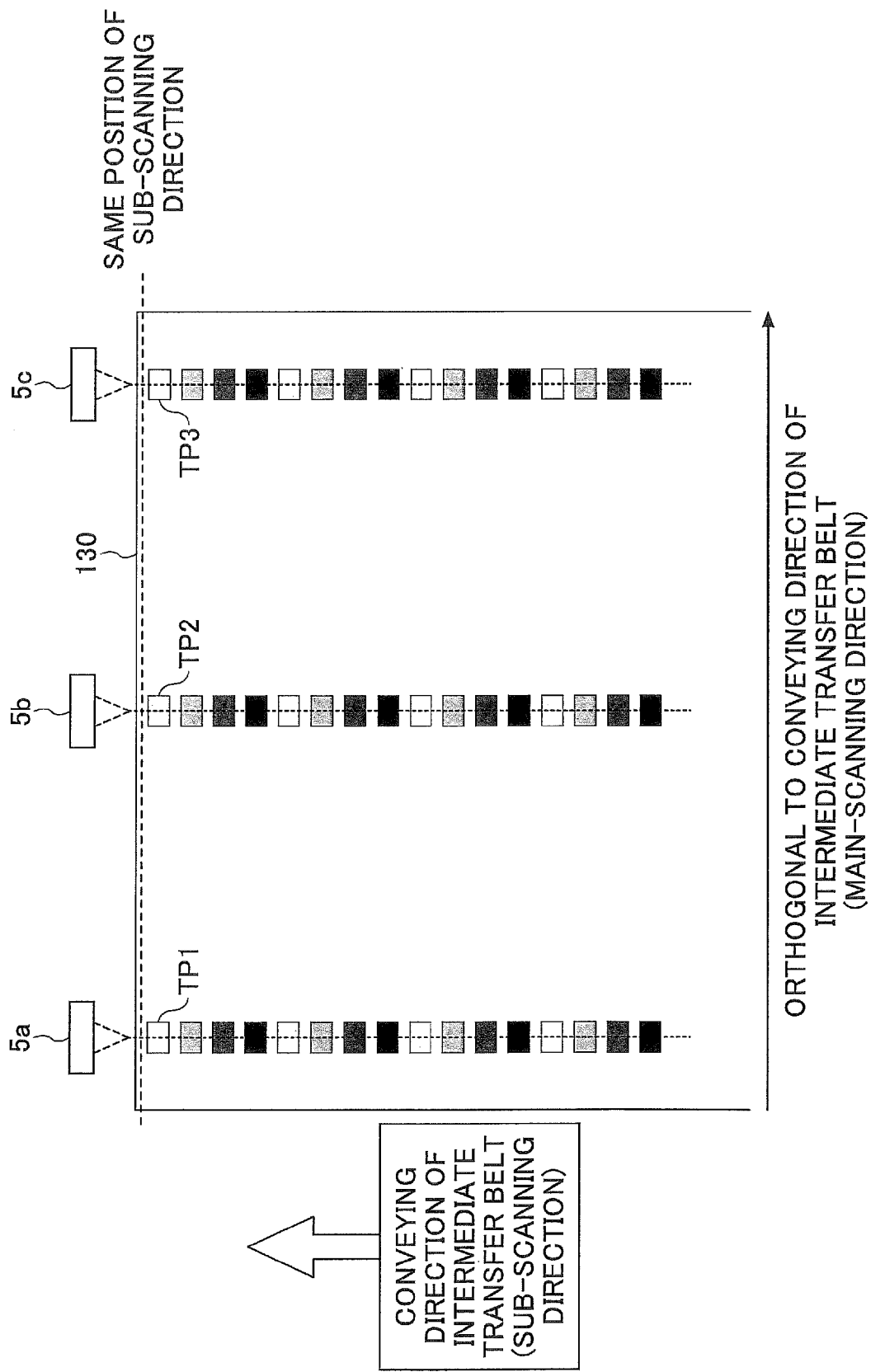

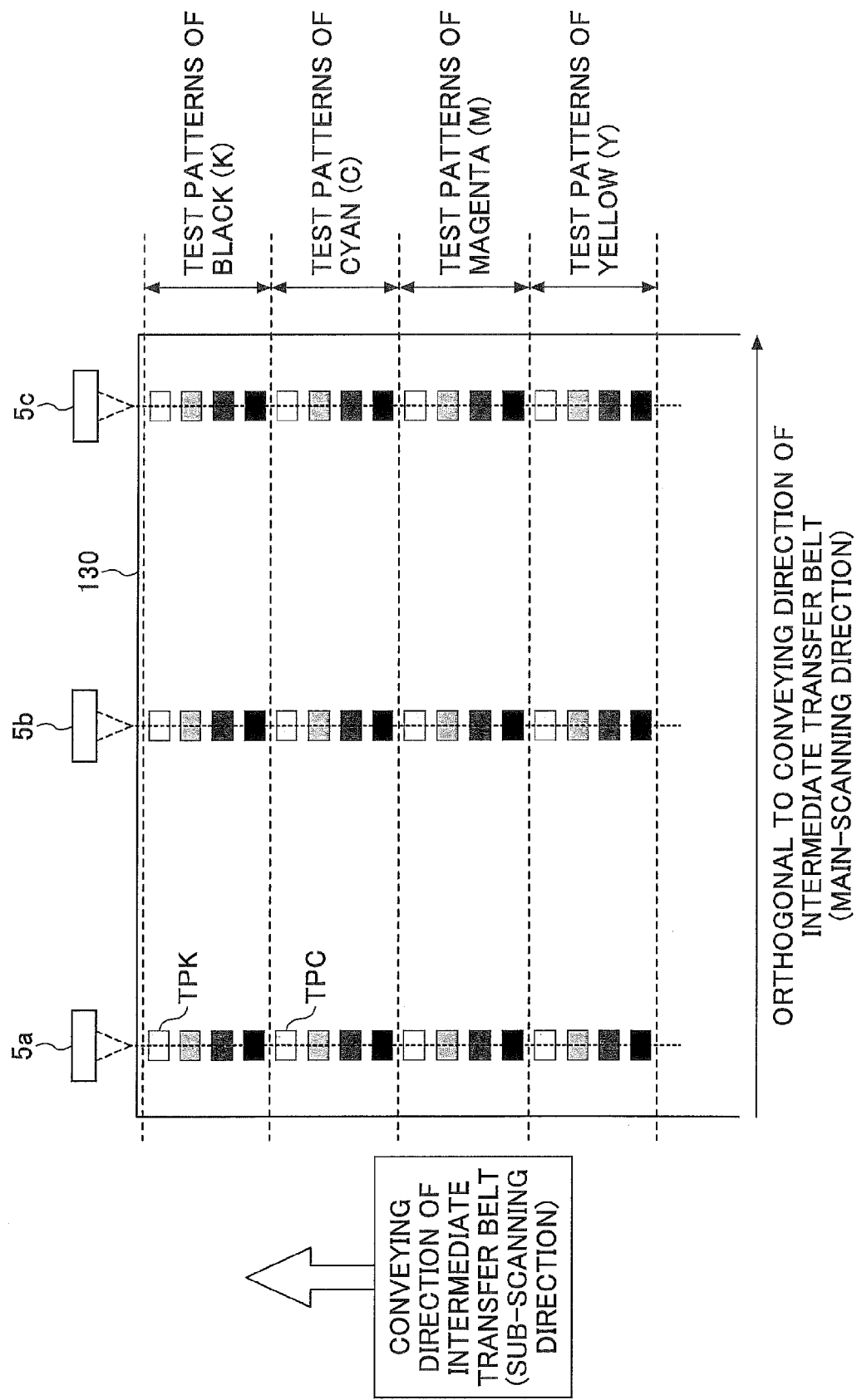

IMAGE FORMATION APPARATUS AND IMAGE FORMATION METHOD

CROSS-REFERENCE TO RELATED APPLICATIONS

The present application is based on and claims the benefit of priority of Japanese Priority Application No. 2014-145048 filed on Jul. 15, 2014, the entire contents of which are hereby incorporated by reference.

BACKGROUND OF THE INVENTION

Field of the Invention

The present invention relates to an image formation apparatus and an image formation method.

Description of the Related Art

There are methods for performing correction in which toner patterns for correction are formed on an intermediate transfer belt.

In correction of related art, image data is corrected in accordance with a gradation table, stored screen data is referred to depending on resolution, and a suitable screen is applied to pixels of the corrected image data to generate binary image data (see Patent Document 1, for example).

However, because data about all patterns is stored in the related art, storage capacity needs to be large.

[Patent Document 1] Japanese Laid-Open Patent Application No. 2012-195715

SUMMARY OF THE INVENTION

It is a general object of at least one embodiment of the present invention to reduce necessity of storage capacity.

In an embodiment, an image formation apparatus for forming an image and test patterns is provided. The image formation apparatus includes a storage unit that stores dither matrix data used to form the image and the test patterns; and an image formation unit that forms the test patterns based on the dither matrix data, wherein a number of tones of the test patterns to be formed by the image formation unit is changed and the number of tones is determined based on a size of the dither matrix data and a number of bits per pixel within the dither matrix data.

According to the present invention, it is possible to reduce the necessity of storage capacity.

BRIEF DESCRIPTION OF THE DRAWINGS

Other objects and further features of embodiments will become apparent from the following detailed description when read in conjunction with the accompanying drawings, in which:

FIG. 3 is a diagram illustrating halftone density correction by an image formation apparatus according to an embodiment of the present invention;

FIG. 7 is a functional block diagram illustrating a functional configuration of an image formation apparatus according to an embodiment of the present invention;

FIG. 8 is a diagram illustrating adjustment based on a result of detection by detection sensors of an image formation apparatus according to an embodiment of the present invention; and FIG. 9 is a diagram illustrating a case where dither matrix data according to an embodiment of the present invention is used in common.

DESCRIPTION OF THE PREFERRED EMBODIMENTS

In the following, embodiments of the present invention will be described with reference to the accompanying drawings.

<Schematic Configuration of Image Formation Apparatus>

Figure 1:
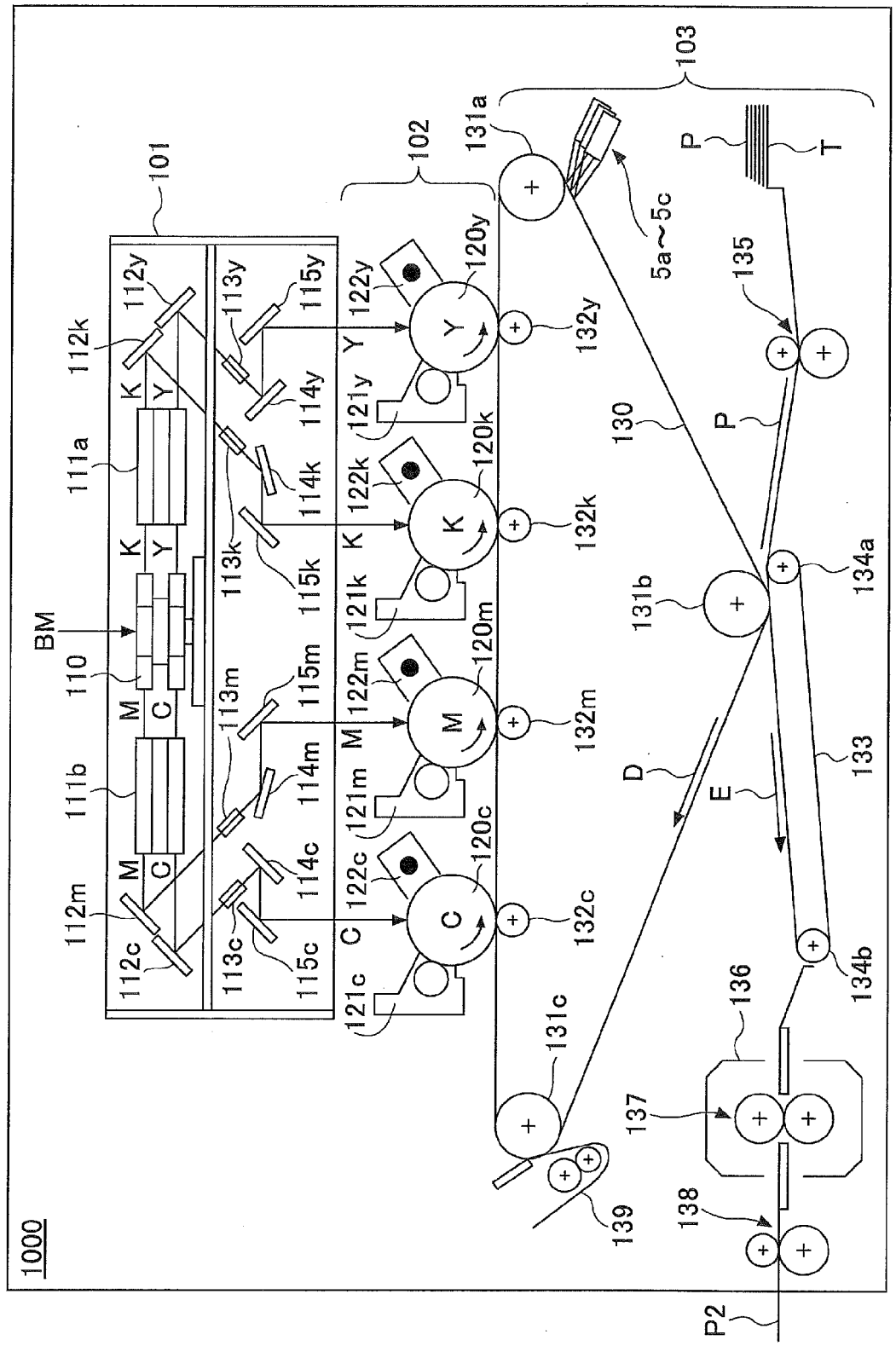
FIG. 1 is a schematic diagram of an entire configuration of an image formation apparatus according to an embodiment of the present invention.

FIG. 1 is a schematic diagram of an entire configuration of an image formation apparatus according to an embodiment of the present invention.

Examples of an image formation apparatus 1000 include a facsimile device, a printing device (printer), a copier, and a multifunction peripheral.

The image formation apparatus 1000 is an image formation apparatus of an electrophotography type including a secondary transfer mechanism called a tandem system for color image formation as shown in FIG. 1, for example. In the following, a case of FIG. 1 is described as an example.

The image formation apparatus 1000 includes an individual photoconductor drum (hereafter referred to as "photoconductor") for each color of yellow (Y), cyan (C), magenta (M), and black (K) (in the following, color may be represented by the letter in parentheses where necessary), for example.

The image formation apparatus 1000 includes an optical device 101, an image formation unit 102, and a transfer unit 103. The optical device 101, the image formation unit 102, and the transfer unit 103 form an image and test patterns.

The optical device 101 deflects light beams BM emitted from a plurality of light sources (not shown) using a polygon mirror 110 and projects the deflected light beams BM onto scanning lenses 111*a* and 111*b*. The scanning lenses 111*a* and 111*b* may include an fθ lens, for example.

The number of the light beams BM corresponds to the number of colors: yellow (Y), black (K), magenta (M), and cyan (C). The light beams BM pass through the scanning lenses 111*a* and 111*b* and are then reflected on reflecting mirrors 112*y*-112*c*.

For example, a yellow light beam Y passes through the scanning lens 111*a* and is reflected on the reflecting mirror 112*y*. Since black, magenta, and cyan light beams travel in the same manner, descriptions thereof are omitted.

WTL lenses 113*y*-113*c* shape the respective light beams Y-C that have been projected thereon after being reflected on the reflecting mirrors 112y-112c and then the light beams Y-C are deflected by reflecting mirrors 114y-114c.

The light beams Y-C deflected by the reflecting mirrors 114y-114c are reflected on reflecting mirrors 115y-115c. After the reflection, photoconductors 120y-120c are irradiated image-wise with the light beams Y-C for exposure.

The irradiation of the photoconductors 120y-120c with the light beams Y-C is performed using a plurality of optical components such as the WTL lenses 113y-113c, the reflecting mirrors 114y-114c, and the reflecting mirrors 115y-115c described above. The image formation apparatus 1000 performs timing synchronization related to a main-scanning direction and a sub-scanning direction for the photoconductors 120y-120c.

In the following description, the main-scanning direction for the photoconductors 120y-120c is assumed to be a scanning direction of the light beam and the sub-scanning direction for the photoconductors 120y-120c is assumed to be a direction orthogonal to the main-scanning direction and to be a rotation direction of the photoconductors 120y-120c.

The photoconductors 120y-120c each include charge generation layers, charge transport layers, and photoconductive layers on conductive drums made of aluminum or the like. The photoconductive layer has a corotron, a scorotron, or a charging roller. Chargers 122y-122c provide surface charges.

Static charges provided on surfaces of the photoconductors 120y-120c by the chargers 122y-122c are exposed image-wise to the light beams Y-C. An electrostatic latent image is formed on a scanned surface of each of the photoconductors 120y-120c.

Developing devices 121y-121c each include developing sleeves, developer supply rollers, regulating blades, and the like. The electrostatic latent images formed on the scanned surfaces of the photoconductors 120y-120c are developed by the developing devices 121y-121c. Developer images are formed on the scanned surfaces of the photoconductors 120y-120c by the development.

Each developer image carried on the scanned surface of the individual photoconductors 120y-120c is transferred onto an intermediate transfer belt 130 which is moved by conveying rollers 131a-131c in a direction indicated by an arrow D. Primary transfer rollers 132y-132c are disposed for the respective photoconductors 120y-120c.

The intermediate transfer belt 130 conveys to a secondary transfer unit a superposed developer image of Y, K, M, and C transferred from the scanned surfaces of the photoconductors 120y-120c. In other words, the intermediate transfer belt 130 corresponds to an intermediate transfer body.

The secondary transfer unit includes a secondary transfer belt 133, a conveying roller 134a, and a conveying roller 134b. The secondary transfer belt 133 is moved by the conveying roller 134a and the conveying roller 134b in a direction indicated by an arrow E.

A recording medium P is provided to the secondary transfer unit by a conveying roller 135 from a recording medium container unit T such as a paper feeding cassette. The recording medium P which serves as receiving material is made of paper, a plastic sheet, a metal sheet, or the like. The secondary transfer unit applies a secondary transfer bias voltage, so that the multicolor developer image carried on the intermediate transfer belt 130 is transferred to the recording medium P suction-held on the secondary transfer belt 133.

Next, the recording medium P is provided to a fixing device 136 while the secondary transfer belt 133 is moved.

The fixing device 136 includes a fixing member 137 such as fixing rollers. The fixing rollers include members made of silicone rubber, fluororubber, or the like. The fixing device 136 presses and heats the recording medium P and the multicolor developer image. Then paper ejection rollers 138 eject the recording medium P from the image formation apparatus 1000 as printed matter P2.

After the multicolor developer image is transferred, residual developer is removed from the intermediate transfer belt 130 by a cleaning unit 139. The cleaning unit 139 includes a cleaning blade (not shown). After the removal, the image formation apparatus 1000 performs a next image formation process.

The image formation apparatus 1000 also includes three detection sensors (hereafter also referred to as "detection sensor") in the vicinity of the conveying roller 131a.

The detection sensors 5a, 5b, and 5c detect a test pattern formed on the intermediate transfer belt 130. Examples of the test pattern include a test pattern for a color shift correction process and a test pattern for a density correction process.

The detection sensors 5a, 5b, and 5c employ a known reflective photo sensor, for example. Amounts of various types of deviations are calculated based on a result of detection by the detection sensors 5a, 5b, and 5c.

Examples of the amount of deviation include an amount of skew (inclination) deviation of each color relative to a reference color, an amount of main scanning registration deviation, an amount of sub-scanning registration deviation, and a main scanning magnification error. Various types of deviations are corrected based on the amount of deviation. In a process to correct deviation, image formation conditions such as color shift and density are corrected, and a test pattern is formed with the corrected image formation conditions.

<Hardware Configuration>

Figure 2:
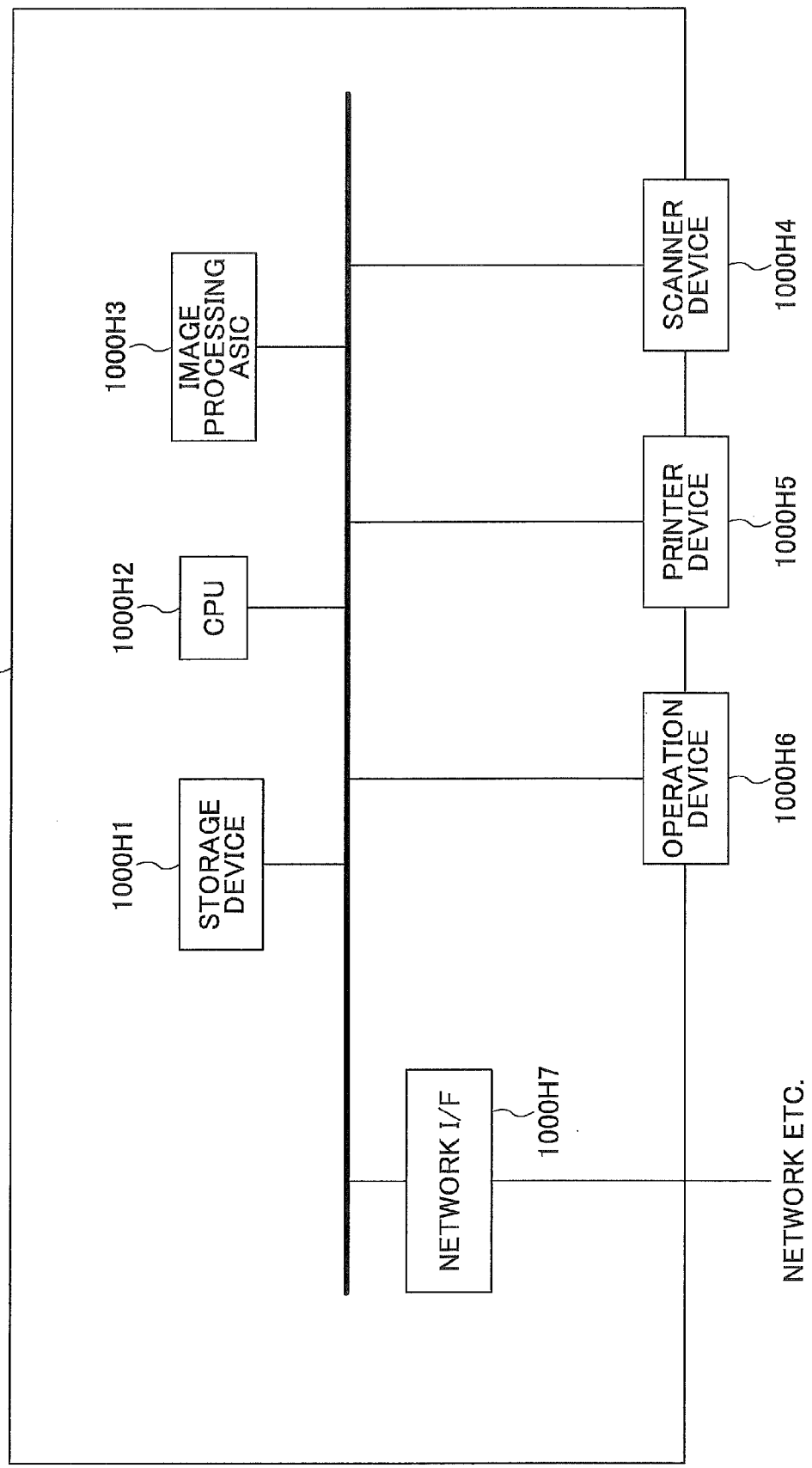
FIG. 2 is a block diagram illustrating a hardware configuration of an image formation apparatus according to an embodiment of the present invention.

FIG. 2 is a block diagram illustrating a hardware configuration of an image formation apparatus according to the embodiment of the present invention.

The image formation apparatus 1000 includes a storage device 1000H1, a Central Processing Unit (CPU) 1000H2, an image processing Application Specific Integrated Circuit (ASIC) 1000H3, a scanner device 1000H4, a printer device 1000H5, an operation device 1000H6, and a network interface (I/F) 1000H7.

The storage device 1000H1 stores data, a program, and the like used by the image formation apparatus 1000 to perform a process. The storage device 1000H1 may employ a memory, a hard disk, or the like.

The CPU 1000H2 performs an operation for a process performed by the image formation apparatus 1000 and controls devices included in the image formation apparatus 1000.

The image processing ASIC 1000H3 implements an image process performed by the image formation apparatus 1000.

The scanner device 1000H4 is an input device that inputs image data based on which the image formation apparatus 1000 forms an image.

The printer device 1000H5 is an output device that forms an image on a recording medium using image data input to the image formation apparatus 1000.

The operation device 1000H6 is an input device that performs an operation to input settings and the like of the image formation apparatus 1000.

The network I/F 1000H7 is an interface that inputs or outputs data to or from the image formation apparatus 1000 via a network.

The hardware configuration is not limited to the configuration shown in FIG. 2. For example, the CPU 1000H2 or the image processing ASIC 1000H3 may be constituted with a plurality of Integrated Circuits (IC).

<Halftone Density Correction>

FIG. 3 is a diagram illustrating halftone density correction by an image formation apparatus according to the embodiment of the present invention.

In FIG. 3, halftone density correction is performed on four tones of four colors including black (K), cyan (C), magenta (M), and yellow (Y).

As shown in FIG. 3, when halftone density correction is performed, toner test patterns are formed on the intermediate transfer belt 130 in a conveying direction of the intermediate transfer belt 130 such that the formed toner test patterns face the detection sensors 5*a*, 5*b*, and 5*c* shown in FIG. 1. The test patterns are formed on the intermediate transfer belt 130 shown in FIG. 1.

Each test pattern is formed by applying corresponding matrix data to the intermediate transfer belt 130 in a sub-scanning direction which corresponds to the conveying direction of the intermediate transfer belt 130 (hereafter "sub-scanning direction") and in a main-scanning direction which is orthogonal to the conveying direction of the intermediate transfer belt 130 (hereafter "main-scanning direction") and performing a thinning process, for example.

The detection sensors 5*a*, 5*b*, and 5*c* detect the test patterns formed on the intermediate transfer belt 130 shown in FIG. 1. The image formation apparatus 1000 calculates density if an image is to be formed on a recording medium such as paper based on a result of the detection of the test patterns formed on the intermediate transfer belt 130 shown in FIG. 1. The image formation apparatus 1000 changes parameters of the image processing ASIC 1000H3 shown in FIG. 2 such that a predetermined density is obtained when the image is formed on the recording medium.

In the halftone density correction, if a number of tones of test patterns to be created is increased, the image formation apparatus 1000 can perform the halftone density correction with good accuracy. However, if the number of tones of test patterns to be created is increased, a number of sets of matrix data for dithering is increased, so that storage capacity needs to be large.

<Dithering22

Dithering is used to express density in multiple tones when an image is formed. The dithering increases or decreases dots within a pixel matrix for image data on the basis of predetermined conditions. When the image is formed, the dithering can express multiple tones, namely, levels of density by increasing or decreasing dots.

Figure 4C:
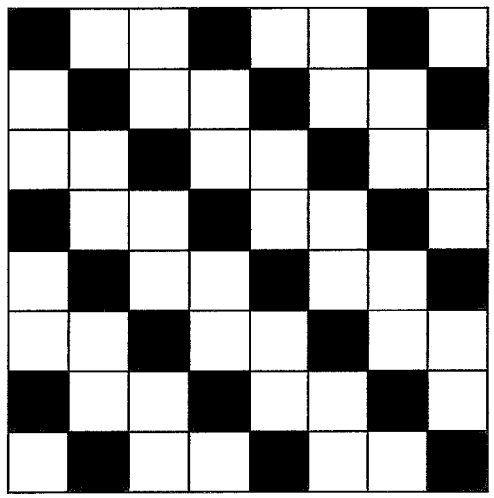
FIG. 4C is a diagram illustrating dithering by an image formation apparatus according to an embodiment of the present invention.
Figure 4B:
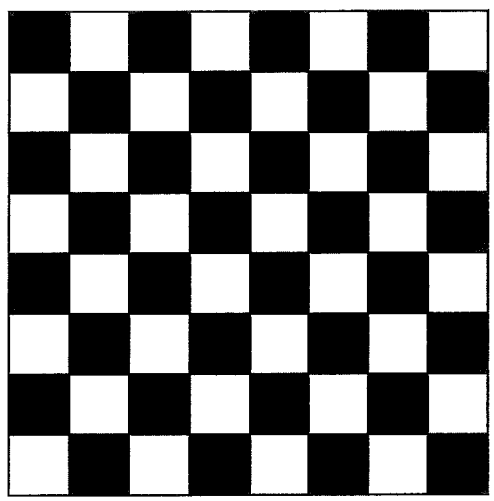
FIG. 4B is a diagram illustrating dithering by an image formation apparatus according to an embodiment of the present invention.
Figure 4A:
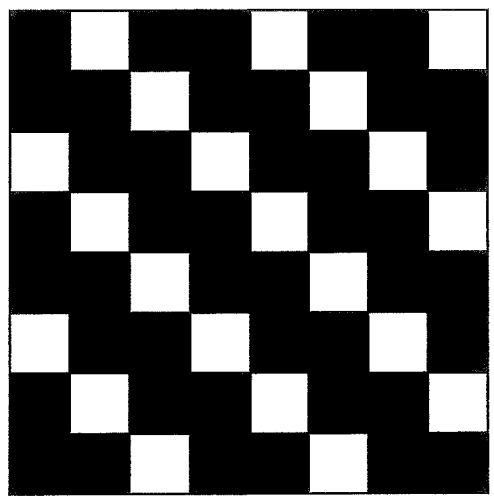
FIG. 4A is a diagram illustrating dithering by an image formation apparatus according to an embodiment of the present invention.

FIGS. 4A-4C are diagrams illustrating the dithering by an image formation apparatus according to the embodiment of the present invention.

In FIGS. 4A-4C, dither matrix data having a size of 8 rows and 8 columns is used.

FIG. 4A illustrates a case where 33 percent density is expressed by the dithering according to the embodiment of the present invention.

FIG. 4B illustrates a case where 50 percent density is expressed by the dithering according to the embodiment of the present invention.

FIG. 4C illustrates a case where 66 percent density is expressed by the dithering according to the embodiment of the present invention.

The dithering employs a plurality of sets of dither matrix data. The dither matrix data is stored in the storage device 1000H1 shown in FIG. 2, for example.

When the image formation apparatus 1000 performs dithering, the image formation apparatus 1000 needs to set a size of a dither matrix and specify how pixels are arranged within the matrix. In the cases of FIGS. 4A-4C, the specification of how pixels are arranged within the matrix requires a data volume of 1 bit for 1 pixel. In other words, in the cases of FIGS. 4A-4C, the dither matrix data requires a data volume of 8 rows×8 columns×1 bit=64 bits.

The halftone density correction needs to express a plurality of tones by dithering. A data volume required for the density correction is equal to a total of data volumes related to dithering for tones to be expressed.

Figure 5:
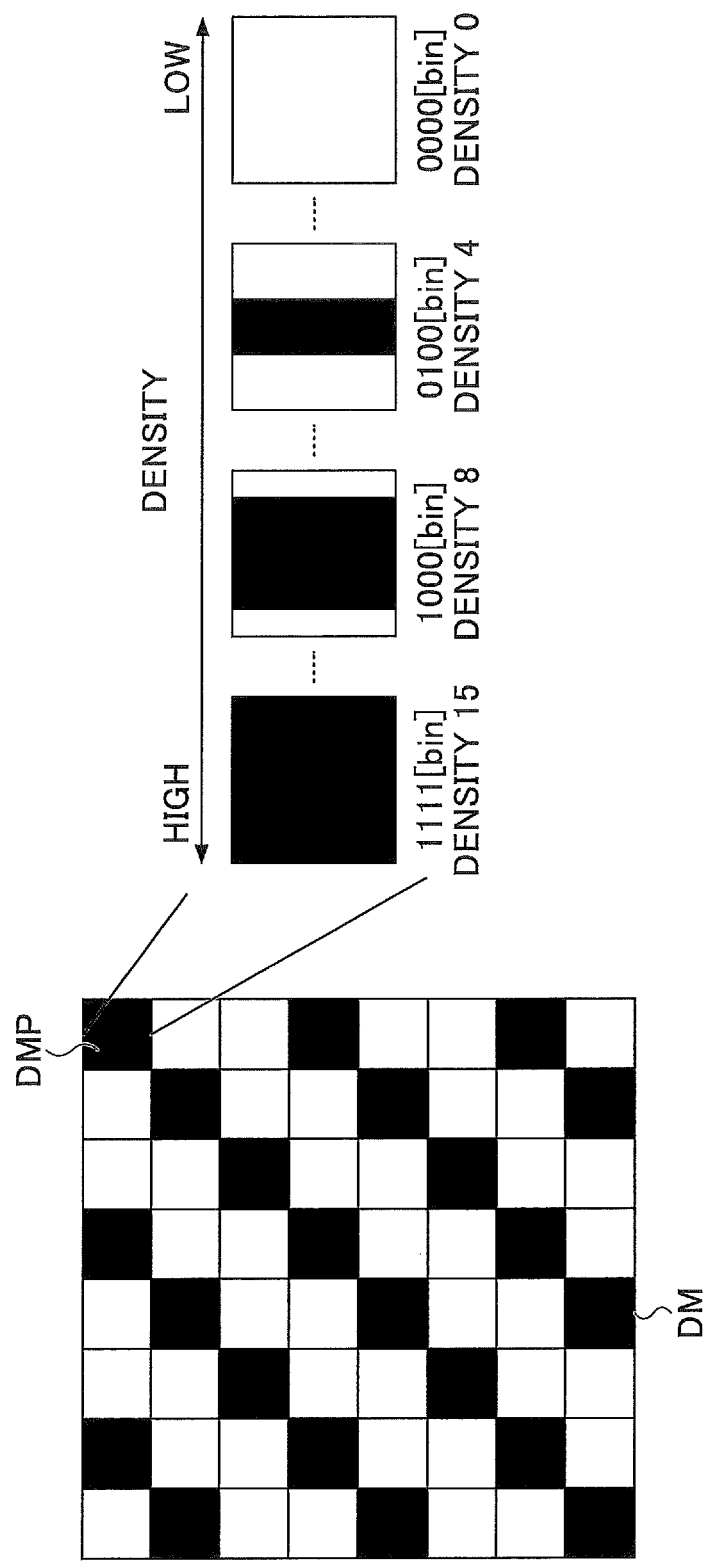
FIG. 5 is a diagram illustrating a case where 1 pixel in a dithering matrix has 4-bit data according to an embodiment of the present invention.

FIG. 5 is a diagram illustrating a case where 1 pixel in a dithering matrix has 4-bit data according to the embodiment of the present invention.

FIG. 5 illustrates dither matrix data DM having a size of 8 rows and 8 columns. In the dither matrix data DM in FIG. 5, a plurality of bits may be specified for 1 pixel while 1 bit is specified for 1 pixel in FIGS. 4A-4C. FIG. 5 illustrates a case where 4 bits are specified for a pixel DMP included in the dither matrix data DM. In the following, the case shown in FIG. 5 is described as an example.

When 4 bits are specified for the pixel DMP, 16 tones of density are expressed with a density value ranging from 0 to 15. If the density value is ("0000" in binary notation), the pixel DMP is formed with a lowest pixel density. If the density value is 15 ("1111" in binary notation), the pixel DMP is formed with a highest pixel density.

When an image is formed, a lighting time of a Laser Diode (LD) or the like (not shown) that serves as a light source of a light beam BM in FIG. 1 is controlled on the basis of the density value. The image formation apparatus 1000 performs the control such that the lighting time of the LD or the like becomes longer if the density is to be increased or the lighting time of the LD or the like becomes shorter if the density is to be reduced.

When a plurality of bits are specified for the pixel DMP, the image formation apparatus 1000 can specify density in greater detail and perform dithering with an increased number of tones.

Figure 6:
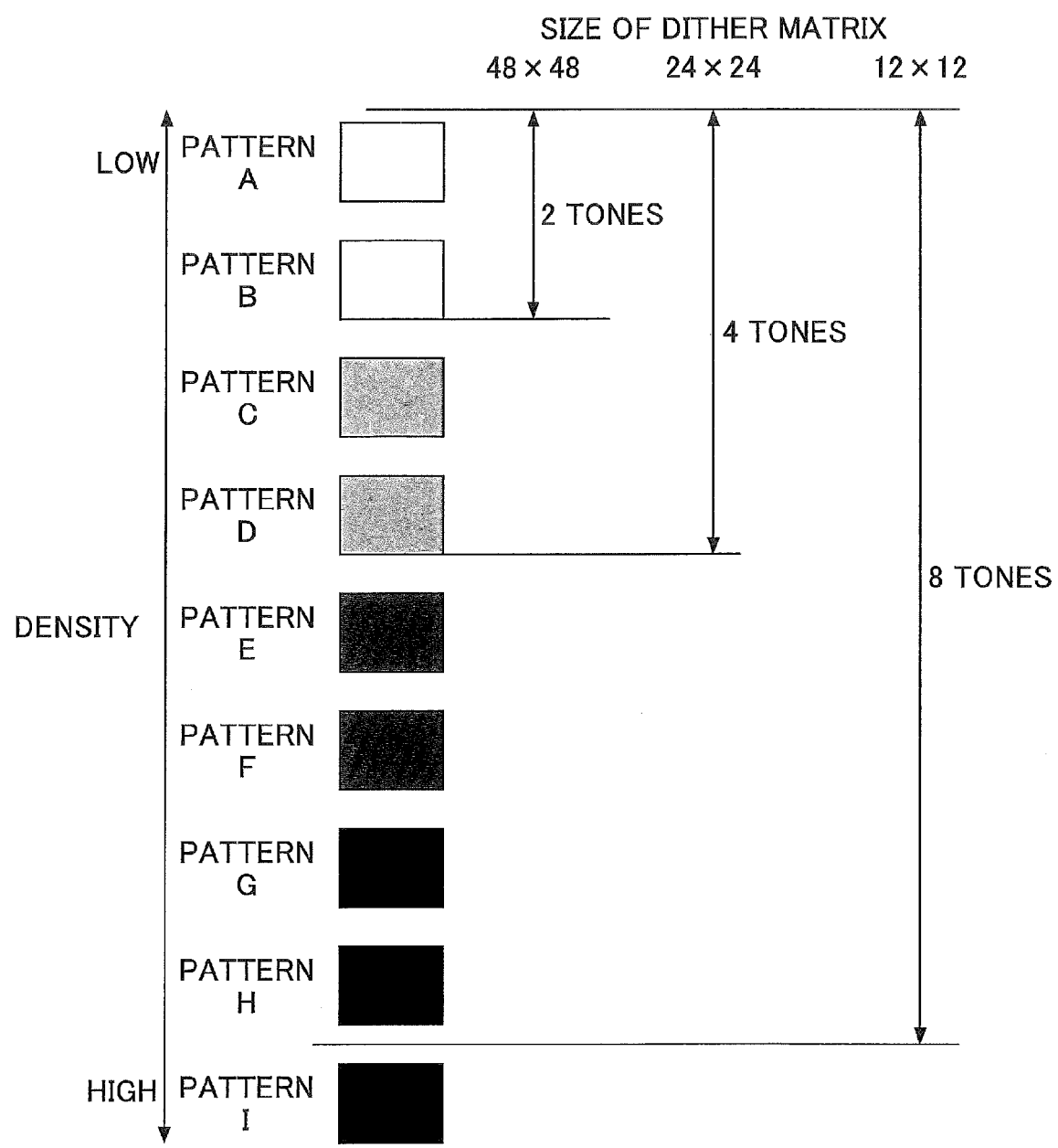
FIG. 6 is a diagram illustrating patterns of a dither matrix for adjusting halftone image density according to an embodiment of the present invention.

FIG. 6 is a diagram illustrating patterns of the dither matrix data DM for adjusting halftone image density according to the embodiment of the present invention.

When a test pattern for adjusting halftone image density is formed, the image formation apparatus 1000 uses dither matrix data DM to form the test pattern. The dither matrix data DM to be used is determined based on a size of the dither matrix data DM and a number of bits per 1 pixel within the dither matrix data DM.

If the dither matrix data DM has a size of 48 rows and 48 columns, 1 bit is specified for 1 pixel in the dither matrix data DM, and 2 tones having pattern A and pattern B are created; then a data volume of the dither matrix data DM will be 48 rows x 48 columns×1 bit×2 tones=4608 bits. If the image formation apparatus 1000 forms an image using 4 color versions, the data volume of the dither matrix data DM will be 4608 bits×4 colors=18432 bits.

If a plurality of bits are specified for 1 pixel in the dither matrix data DM, the data volume of the dither matrix data DM may be greater than the case where 1 bit is specified for 1 pixel. For example, if the dither matrix data DM has a size of 24 rows and 24 columns, 2 bits are specified for 1 pixel in the dither matrix data DM, and 8 tones ranging from patterns A to H are created, a data volume of the dither matrix data DM will be 24 rows×24 columns×2 bits×8 tones=9216 bits. If the image formation apparatus 1000 forms an image using 4 color versions, the data volume of the dither matrix data DM will be 9216 bits×4 colors=36864 bits.

Accordingly, in the embodiment of the present invention, if the dither matrix data DM has the size of 24 rows and 24 columns and 2 bits are specified for 1 pixel in the dither matrix data DM, patterns to be created are changed to 4 tones ranging from patterns A to D as shown in FIG. 6. In this case, the dither matrix data DM will have a data volume of 24 rows×24 columns×2 bits×4 tones=4608 bits. If the image formation apparatus 1000 forms an image using 4 color versions, the data volume of the dither matrix data DM will be 4608 bits×4 colors=18432 bits.

Further, if the dither matrix data DM has a size of 12 rows and 12 columns and 4 bits are specified for 1 pixel in the dither matrix data DM, patterns to be created are changed to 8 tones ranging from patterns A to H as shown in FIG. 6. In this case, the dither matrix data DM will have a data volume of 12 rows×12 columns×4 bits×8 tones=4608 bits. If the image formation apparatus 1000 forms an image using 4 color versions, the data volume of the dither matrix data DM will be 4608 bits×4 colors=18432 bits.

If other patterns are to be created, the image formation apparatus 1000 overwrites the dither matrix data DM. For example, if other patterns are to be created in a case where the dither matrix data DM has a size of 48 rows and 48 columns, 1 bit is specified for 1 pixel, and 2 tones having pattern A and pattern B have been created, the image formation apparatus 1000 overwrites the dither matrix data DM about pattern A and pattern B. The overwriting replaces the stored dither matrix data DM about pattern A and pattern B with another dither matrix data DM about pattern C and pattern D, for example. By performing the overwriting, it is possible to eliminate the need to increase a storage area for storing the dither matrix data DM, thereby reducing necessity of storage capacity.

<Functional Configuration>

FIG. 7 is a functional block diagram illustrating a functional configuration of the image formation apparatus according to the embodiment of the present invention.

The image formation apparatus 1000 includes a storage unit 1000F1, an image formation unit 1000F2, a detection unit 1000F3, and a change unit 1000F4.

The storage unit 1000F1 stores various types of data such as dither matrix data DM. The storage unit 1000F1 is implemented by the storage device 1000H1 shown in FIG. 2, for example.

The image formation unit 1000F2 forms an image. The image formation unit 1000F2 performs dithering based on dither matrix data DM stored in the storage unit 1000F1 and forms the image with a predetermined density. The image formation unit 1000F2 forms the image based on input image data and forms a test pattern with a predetermined density for density correction, for example.

When an image is to be formed on a recording medium, the image formation unit 1000F2 performs correction such as tone correction on input image data based on a result of detection of the test pattern by the detection unit 1000F3. The image formation unit 1000F2 forms the image on the recording medium based on an image subjected to correction such as the tone correction.

When the test pattern is formed on the intermediate transfer belt 130, the image formation unit 1000F2 forms the test pattern on the intermediate transfer belt 130 on the basis of the dither matrix data DM stored in the storage unit 1000F1.

The image formation unit 1000F2 is implemented by the CPU 1000H2, the image processing ASIC 1000H3, and the printer device 1000H5 shown in FIG. 2, for example.

The detection unit 1000F3 detects the test pattern or the like formed by the image formation unit 1000F2. In density correction, for example, the detection unit 1000F3 detects density of the test pattern as a density value. The detection unit 1000F3 is implemented by the detection sensors 5a, 5b, and 5c shown in FIG. 3, for example.

The change unit 1000F4 changes a number of tones of the test patterns to be formed by the image formation unit 1000F2. The change unit 1000F4 calculates the number of tones based on a size of the dither matrix data DM and a number of bits per 1 pixel within the dither matrix data DM as shown in FIG. 6. The change unit 1000F4 is implemented by the CPU 1000H2 shown in FIG. 2, for example. The change unit 1000F4 may also be implemented by a user of the image formation apparatus 1000 when the user calculates the number of tones and inputs the number of tones through the operation device 1000H6 shown in FIG. 2, for example.

The image formation apparatus 1000 changes a number of tones of an image to be formed based on the size of the dither matrix data DM and the number of bits per 1 pixel within the dither matrix data DM. The change of the number of tones is to reduce the number of tones if the size of the dither matrix data DM or the number of bits per 1 pixel within the dither matrix data DM becomes greater, for example. By changing the number of tones, it is possible to limit types of the dither matrix data DM to be stored. When the number of the dither matrix data DM to be stored is limited, it is possible to reduce storage capacity for storing dither matrix data DM.

<Adjustment Based on Result of Detection by detection sensors>

The image formation apparatus 1000 may perform adjustment based on a result of detection output by the detection sensors 5a, 5b, and 5c shown in FIG. 3 which detect density of a formed test pattern. In the following, a case where the detection sensors 5a, 5b, and 5c shown in FIG. 3 detect the density of the test pattern is described as an example.

The detection sensors 5a, 5b, and 5c shown in FIG. 3 may have what is called deviation (hereafter "deviation") where detection sensors of the same type do not detect the same amount of tones from test patterns formed with the same density.

If the image formation apparatus 1000 includes a plurality of detection sensors such as the detection sensors 5a, 5b, and 5c shown in FIG. 3, the image formation apparatus 1000 detects deviation and performs adjustment such as correction of input image data such that the deviation among the detection sensors is eliminated. The adjustment by the correction of image data is carried out by the CPU 1000H2, the image processing ASIC 1000H3, and the like shown in FIG. 2.

FIG. 8 is a diagram illustrating the adjustment based on a result of detection by the detection sensors 5a, 5b, and 5c of the image formation apparatus 1000 according to the embodiment of the present invention.

In the following, the adjustment based on the result of detection by the detection sensors 5a, 5b, and 5c arranged in the main-scanning direction as shown in FIG. 8 is described as an example.

In the adjustment based on the result of detection by the detection sensors 5a, 5b, and 5c, the image formation apparatus 1000 forms the same test patterns in the same positions of the sub-scanning direction and in the main-scanning direction such that each detection sensor can detect the test pattern. In the case shown in FIG. 8, the image formation apparatus 1000 forms a test pattern TP1, a test pattern TP2, and a test pattern TP3 in the same positions of the sub-scanning direction. The formed test pattern TP1 is also in a position of the main-scanning direction that is to be detected by the detection sensor 5a. The formed test pattern TP2 is also in a position of the main-scanning direction that is to be detected by the detection sensor 5b. The formed test pattern TP3 is also in a position of the main-scanning direction that is to be detected by the detection sensor 5c. The test pattern TS1, the test pattern TS2, and the test pattern TS3 are the same test patterns, namely, test patterns formed with the same density.

Since the test patterns TP1, TP2, and TP3 are formed in the same positions of the sub-scanning direction, the detection sensors 5a, 5b, and 5c can detect the test patterns TP1, TP2, and TP3 at the same time. Since the test patterns TP1, TP2, and TP3 are formed with the same density, the image formation apparatus 1000 can calculate deviation of each detection sensor by comparing amounts of detection detected at the same time.

Based on a result of detection of the test patterns by each detection sensor, the test pattern being formed using the dither matrix data DM, the image formation apparatus 1000 calculates density if an image is to be formed on a recording medium such as paper using the same dither matrix data DM. When the image is formed on the recording medium, the image formation apparatus 1000 performs correction such as tone correction on input image data from density calculated on the basis of a detection result of the test patterns TP1 to TP3. The image formation apparatus 1000 performs the correction such as tone correction in consideration of deviation of each detection sensor.

In the adjustment based on the result of detection by the detection sensors 5a, 5b, and 5c, the image formation apparatus 1000 forms the test patterns in the same positions of the sub-scanning direction using the same dither matrix data DM. By using the same dither matrix data DM, the image formation apparatus 1000 can form the test patterns with the same density. By using the same dither matrix data DM, the image formation apparatus 1000 can reduce dither matrix data DM to be stored in comparison with a case where a plurality of sets of dither matrix data DM are used. Accordingly, the image formation apparatus 1000 can reduce storage capacity by using the same dither matrix data DM.

<Dither Matrix Data When Used in Common>

The image formation apparatus 1000 may form an image using a plurality of color versions. In this case, the image formation apparatus 1000 may form a test pattern for each color version. In the following, a case where the image formation apparatus 1000 forms test patterns using four color versions including black (K), cyan (C), magenta (M), and yellow (Y) is described as an example.

FIG. 9 is a diagram illustrating a case where the dither matrix data DM according to the embodiment of the present invention is used in common.

When the test patterns of four color versions are formed, the image formation apparatus 1000 forms the test patterns of four color versions in positions of the main-scanning direction to be detected by detection sensors 5a, 5b, and 5c as shown in FIG. 9. In this case, the test patterns have different densities for each color version.

Test patterns of different color versions may have the same density. For example, the image formation apparatus 1000 forms a test pattern TPK of black (K) and a test pattern TPC of cyan (C) with the same density as shown in FIG. 9.

The image formation apparatus 1000 uses the same dither matrix data DM upon forming the test pattern TPK of black (K) and the test pattern TPC of cyan (C). In other words, the same dither matrix data DM is used in common in order to form the test pattern TPK of black (K) and the test pattern TPC of cyan (C) which are different color versions. The image formation apparatus 1000 performs a process to have different times to form the test pattern TPK of black (K) and the test pattern TPC of cyan (C), for example. The image formation apparatus 1000 performs a process to rewrite dither matrix data DM for each color version in a storage area of the storage device 1000H1 by the CPU 1000H2 in FIG. 2, for example. The image formation apparatus 1000 can form the test pattern TPK of black (K) and the test pattern TPC of cyan (C) with the same dither matrix data DM. The embodiment may employ a combination of other color versions. Further, the dither matrix data DM may be used in common among three types of color versions or more.

When the dither matrix data DM is used in common for image formation with different color versions, the necessity to store sets of dither matrix data DM for different color versions is reduced in the image formation apparatus 1000. Accordingly, the image formation apparatus 1000 can reduce a volume of dither matrix data DM to store by using the dither matrix data DM in common for image formation with different color versions, thereby reducing storage capacity.

In the embodiment, a part of or the entire portion of each process or control may be implemented by a Programmable Logic Device (PLD) such as Field-Programmable Gate Array (FPGA), for example.

Further, the present invention is not limited to these embodiments, and various variations and modifications may be made without departing from the scope of the present invention.

What is claimed is:

1. An image formation apparatus for forming an image and test patterns, the image formation apparatus comprising:
   a storage unit that stores dither matrix data used to form the image and the test patterns; and
   an image formation unit that forms the test patterns based on the dither matrix data, wherein a number of tones of the test patterns to be formed by the image formation unit is changed and the number of tones is determined based on a size of the dither matrix data and a number of bits per pixel within the dither matrix data.

2. The image formation apparatus as claimed in claim 1, wherein the storage unit stores dither matrix data that has at least two bits per pixel.

3. The image formation apparatus as claimed in claim 1, wherein the number of tones is determined based on a value obtained by multiplying the size of the dither matrix data by the number of bits per pixel within the dither matrix data and by a number of colors used by the image formation unit.

4. The image formation apparatus as claimed in claim 1, further comprising at least two detection units that detect density of the test patterns formed by the image formation unit, wherein when detection is performed by the detection units, the image formation unit uses the same dither matrix data to form the test patterns in the same positions of a conveying direction of a recording medium.

5. The image formation apparatus as claimed in claim 1, wherein the dither matrix data stored in the storage unit is used in common to form test patterns of different color versions.

6. A method performed by an image formation apparatus for forming an image and test patterns, the method comprising:
   by the image formation apparatus, storing dither matrix data used to form the image and the test patterns;
   by the image formation apparatus, forming the test patterns based on the dither matrix data; and
   by the image formation apparatus, changing a number of tones of the test patterns to be formed, the number of tones being determined based on a size of the dither matrix data and a number of bits per pixel within the dither matrix data.

* * * * *